United States Patent [19]

Kalbfeld

[11] 3,755,355

[45] Aug. 28, 1973

[54] PROCESS OF MANUFACTURING N-MERCAPTOMETHYLPHTHALIMIDE

[76] Inventor: Jules Kalbfeld, 2751 Wright Ave., Pinole, Calif. 94564

[22] Filed: Aug. 12, 1971

[21] Appl. No.: 171,375

Related U.S. Application Data

[63] Continuation-in-part of Ser. No. 868,627, Oct. 22, 1969, abandoned.

[52] U.S. Cl.............................. 260/326 S, 424/274
[51] Int. Cl............................................. C07d 27/52
[58] Field of Search................................. 260/326 S

[56] References Cited
OTHER PUBLICATIONS

Wagner et al. Synthetic Organic Chemistry (1953) p. 778.

*Primary Examiner*—Joseph A. Narcavage
*Attorney*—Daniel C. Block et al.

[57] ABSTRACT

A process of manufacturing N-mercaptomethylphthalimide is described herein. The process involves first forming a solution of sodium bisulfide in situ by reacting a sodium compound with hydrogen sulfide in the presence of a solvent. Then, a solution is formed consisting of N-halomethylphthalimide and tetrahydrofuran which is reacted with the sodium bisulfide solution to form N-mercaptomethylphthalimide.

4 Claims, No Drawings

3,755,355

PROCESS OF MANUFACTURING N-MERCAPTOMETHYLPHTHALIMIDE

CROSS REFERENCE TO RELATED APPLICATION

This application is a continuation-in-part of copending application Ser. No. 868,627, filed Oct. 22, 1969, and now abandoned, entitled PROCESS OF MANUFACTURING N-MERCAPTOMETHYLPHTHALIMIDE.

BACKGROUND OF THE INVENTION

In the art of manufacturing N-mercaptoalkylphthalimides having at least two or more carbon atoms, it is the usual practice to react the respective phthalimide alkyl halide with potassium hydrosulfide. The reaction is usually carried out at elevated temperatures in an alcohol solvent. High yields of the end product are reported. A more detailed study of this procedure can be found in textbooks by Beilstein and Wagner et al.

When this procedure is employed to manufacture the methyl derivative of the N-mercaptoalkylphthalimide, the end product cannot be readily identified. The reaction between the components form an agglomeration of unusable compounds. No theory or hypothesis can be advanced for the failure of this process to manufacture the desired end product.

BRIEF DESCRIPTION OF THE INVENTION

It has been discovered that N-mercaptomethylphthalimide can be manufactured in reasonable yields by forming sodium bisulfide in situ by reacting sodium methylate with hydrogen sulfide in an alcohol solvent or in the alternative forming the sodium bisulfide by reacting a sodium dispersion with hydrogen sulfide. Thereafter, N-halomethylphthalimide in tetrahydrofuran solvent is reacted with the sodium bisulfide at elevated temperatures.

DETAILED DESCRIPTION OF THE INVENTION

In the practice of the present invention, sodium bisulfide is first manufactured in situ by either reacting sodium methylate with hydrogen sulfide or reacting a sodium dispersion with hydrogen sulfide to form the sodium bisulfide. The reaction of the sodium methylate with hydrogen sulfide is carried out in the presence of an alcohol solvent such as methanol, ethanol, or isopropanol. Then, a solution is formed by dissolving N-halomethylphthalimide in tetrahydrofuran and adding to the sodium bisulfide solution. It is essential to the practice of the present invention to dissolve the N-halomethylphthalimide in tetrahydrofuran because other solvent systems will not produce the desired end product. The reaction components are then heated up to about 60°C. for a sufficient length of time to form the end product. The time necessary to form the end product is usually indicated by the cessation of the evolution of hydrogen sulfide. The reaction mixture should be kept under inert atmosphere to prevent formation of diphthalimidomethyl disulfide. The reaction product is filtered and the filtrate stripped to a residue which can be recrystallized from methylene chloride. The halo moiety of the N-halomethylphthalimide can be selected from the group consisting of chlorine or bromine and mixtures thereof.

The compositions manufactured by the process of the present invention are highly reactive intermediates to form pesticides. Thus, the N-mercaptomethylphthalimide can be further reacted with phosphorus derivatives and an aldehyde to form insecticides, miticides and parasiticides having the following formula:

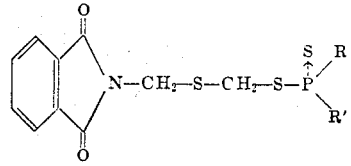

wherein R and R' can each be selected from lower alkyl groups having from one to five carbon atoms or lower alkoxy groups having from one to five carbon atoms.

The compounds encompassed by the above formula are manufactured by reacting the appropriate dialkylphosphorodithioic acid and an aldehyde with N-mercaptomethylphthalimide to provide the desired end product.

In order to illustrate the merits of the present invention the following examples are provided.

EXAMPLE I

An excess of hydrogen sulfide was reacted with 684 grams of 25 percent sodium methylate in a methanol solvent to give a solution of sodium hydrogen sulfide. A solution of N-chloromethylphthalimide in tetrahydrofuran was prepared by adding 586.5 grams of chloromethylphthalimide to 2,500 milliliters of tetrahydrofuran. The N-chloromethylphthalimide solution was added to the sodium hydrogen sulfide solution. The components were heated to 45°C. until no further hydrogen sulfide was given off. The reaction product was filtered, stripped and recrystallized with methylene chloride. The yield was 62 percent.

EXAMPLE II

A sodium dispersion, 3.56 ml., containing 23 mg. of sodium in 0.173 milliliters was charged to a 5 milliliter reactor and washed in with 10 milliliters of tetrahydrofuran that were dried over a molecular sieve after being distilled over sodium hydroxide pellets. Hydrogen sulfide was pressed over the surface until a white precipitate resulted and no more hydrogen evolved. A solution of 1,955 milligrams of N-chloromethylphthalimide in 15 millimeters of tetrahydrofuran was prepared and added to the mixture of tetrahydrofuran and sodium dispersion. A warm-water bath was brought in contact with the reactor. The reactor was kept warm until no further hydrogen sulfide was observed. The mixture was stripped of tetrahydrofuran, the residue taken up in diethyl ether and allowed to stand overnight. The reaction product was stripped and identified as N-mercaptomethylphthalimide in an amount of 42.5 percent yield.

EXAMPLE III

An excess of hydrogen sulfide was reacted with 4,320 ml. of 25 percent sodium methylate in a methanol solvent to get a solution of sodium hydrogen sulfide. Using the methanol as a solvent, 1,955 mg. of chloromethylphthalimide were added as solids to this solution. No identifiable product could be found from this reaction.

EXAMPLE IV

The procedure as outlined in Example III was repeated in its entirety except 3.9 g. of N- chloromethylphthalimide were added as solids. No reaction took place.

EXAMPLE V

The process as outlined in Example III was repeated in its entirety except the N-chloromethylphthalimide was dissolved in tetrahydrofuran at 1.5 mls. per mg. and allowed to react over the weekend. The melting point of the crude product was 126–136. The product was filtered and stripped to a residue to provide 65 percent yield of the desired product.

EXAMPLE VI

A sodium dispersion, 0.865 mls. was charged to a 50 ml. reactor. The precipitate was washed in with 5 ml. of toluene as a solvent. Hydrogen sulfide was passed over the surface until no more hydrogen was liberated from the mixture. Then, 0.977 g. of N-chloromethylphthalimide was charged to the mixture at −67°C. The batch was allowed to warm to room temperature. The resultant product was filtered. No reaction took place and all the starting materials were recovered.

EXAMPLE VII

Preparation of S-(Phthalimido-N-methylthiomethyl)-O,O-diethylphosphorodithioate

Twenty-seven and nine-tenths grams (0.15M) of diethylphosphorodithioic acid was cooled below 10°C. and 15.1 cc. (0.2M) of formalin (37 percent) was added with stirring and cooling below 20°C. The mixture was shaken with 100 cc. of benzene, the aqueous layer removed and the benzene layer dried over anhydrous magnesium sulfate, then filtered into a flask equipped with an apparatus for the continuous removal of water. To the flask was added 19.2 g. (0.1M) of N-mercaptomethylphthalimide, the stirrer was started and the mixture refluxed for 3.5 hours. During this time 1.2 cc. of water collected in the separator. After cooling, the mixture was made slightly basic with cold dilute sodium bicarbonate solution, the aqueous phase removed and the benzene layer washed with dilute sodium chloride solution, dried over anhydrous magnesium sulfate, filtered and evaporated to give 31.7 g. (81 percent of theory) of the product was a viscous liquid, $n_D^{30}$ − 1.5928.

| Analysis | % C | % H | % N | %S |
|---|---|---|---|---|
| Theory | 43.0 | 4.61 | 3.58 | 24.6 |
| Found | 44.6 | 4.82 | 3.71 | 25.0 |

As can be seen from the above examples, it is essential to the practice of the present invention that tetrahydrofuran be employed as a solvent for the N-halomethylphthalimide.

The following is a list of compounds prepared according to the aforedescribed procedures. Compound numbers have been assigned to each compound and are used throughout the balance of the application.

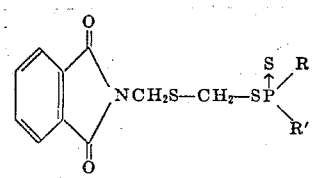

| Compound No. | R | R' | $n_D^{30}$ |
|---|---|---|---|
| *1 | OC$_2$H$_5$ | OC$_2$H$_5$ | 1.5928 |
| 2 | OCH$_3$ | OCH$_3$ | 1.5968 |
| 3 | C$_2$H$_5$ | OCH$_3$ | 1.6088 |
| 4 | C$_2$H$_5$ | OC$_3$H$_7$−i | 1.5793 |

* No. 1 prepared in Example III.

As previously mentioned, the herein described composition produced in the above-described manner are biologically active compounds which are useful and valuable in controlling various pest organisms. The compounds of this invention were tested as miticides in the following manner.

Miticide evaluation test

The two-spotted mite Tetranychus telarius (Linn.) was employed in tests for miticidal activity. Young pinto bean plants in the primary leaf stage were used as host plants. The young pinto bean plants were infested with several hundred mites. Dispersions of candidate materials were prepared by dissolving 0.1 grams in 10 ml. of a suitable solvent, usually acetone. Aliquots of the toxicant solutions were suspended in water containing 0.0175 percent v./v. Sponto 221, which is described as a polyoxy-ethylene sorbitan monolaurate ether of alkylated phenols blended with organic sulfonates, emulsifying agent, the amount of water being sufficient to give concentrations of active ingredient ranging from 0.25 percent to 0.005 percent. The test suspensions were then sprayed on the infested pinto bean plants. After seven days, mortalities of post-embryonic and ovicidal forms were determined. The percentage of kill was determined by comparison with control plants which had not been sprayed with the candidate compounds The LD–50 value was calculated using well-known procedures. The LD–50 values are reported under the columns "PE" and "Eggs" in the table below.

Systemic evaluation test

This test evaluated the root absorption and upward translocation of the candidate systemic compound. The two-spotted mite, Tetranychus telarius (Linn.), was employed in tests for systemic activity. Young pinto bean plants in the primary leaf stage were used as host plants. The pinto bean plants were placed in bottles containing 200 ml. of the test solution and held in place with cotton plugs. Only the roots were immersed. The solutions were prepared by dissolving the compounds to be tested in a suitable solvent, usually acetone, and then diluting distilled water. The final acetone concentration never exceeds about 1 percent. The toxicants were initially tested at a concentration of 10 parts per million (p.p.m). Immediately after the plants were placed in the test solutions they were infested with mites. Mortalities were determined after seven days. The percentage of kill was determined by comparison with control plants which had been placed in distilled water only. The LD–50 value was calculated using well-known procedures. The LD–50 values in p.p.m. are reported under the column "Systemic" in Table I.

The compounds were also found to be active against black bean aphid (Aphis fabae (Scop.)). The same test procedure as given for the two-spotted mite above was used for black bean aphid except that nasturtium (Tropaeolum sp.) plants approximately 2 to 3 inches tall were used as the host plant.

TABLE I

| Compound No. | BA | PE tg Eggs | | Two-Spotted Mites LD-50 Systemic (P.P.M) |
|---|---|---|---|---|
| | Percent Concentration | | | |
| 1 | 0.003 | 0.001 | 0.005 | 8 |
| 2 | 0.0008 | 0.005 | 0.03 | 4 |
| 3 | 0.003 | 0.005 | 0.03 | 4 |
| 4 | 0.003 | 0.003 | 0.03 | >10 |

Internal animal parasite systemic tests

The following procedure describes the chemotherapeutic efficacy tests utilized to demonstrate the animal parasitology activity of the compositions of the present invention.

Unparasitized weanling mice were offered medicated food for 1–2 days prior to inducing infections, and for a total of 21 days infections were administered per os using 100–300 embryonated ova/mouse of *Syphacia obvelata* (So) and 100–300 embryonated ova/mouse of *Aspiculuris tetraptera* (At).

A suitable number of unmedicated littermate mice also received the above infection and served as control to determine the comparative efficacy of the medications. All mice were sacrificed after 21 days (the medication period) and the residual parasites found in the intestine were identified and counted. These counts in the medicated groups were compared to the unmedicated (controls) and a percent efficacy was assigned, (M/ICX100)−100 = % efficacy.

Table II

| Compound No. | Dosage (P.P.M.) | % Efficacy | |
|---|---|---|---|
| | | So. | At. |
| 1 | > 65 | 75 | 100 |
| 2 | > 125 | 83 | 100 |
| 3 | > 30 | 100 | 90 |
| 4 | >65 | 80 | 80 |

What is claimed is:

1. A process of forming N-mercaptomethylphthalimide comprising the steps of:
   a. Forming a sodium bisulfide solution in situ by reacting a sodium compound selected from a sodium dispersion, sodium methylate and mixtures thereof with hydrogen sulfide, said sodium compound being mixed with an alcohol solvent;
   b. Forming a solution of tetrahydrofuran and N-halomethylphthalimide selected from the group consisting of N-chloromethylphthalimide, N-bromomethylphthalimide, and mixtures thereof;
   c. Reacting the solutions formed in steps (a) and (b) together at a temperature of up to about 60°C. to form N-mercaptomethylphthalimide.

2. The process of claim 1 wherein the sodium compound is sodium methylate.

3. The process of claim 1 wherein the sodium compound is a sodium dispersion.

4. The process of claim 1 wherein the N-halomethylphthalimide is N-chloromethylphthalimide.

* * * * *

UNITED STATES PATENT OFFICE
CERTIFICATE OF CORRECTION

Patent No. 3,755,355   Dated August 28, 1973

Inventor(s) Jules Kalbfeld

It is certified that error appears in the above-identified patent and that said Letters Patent are hereby corrected as shown below:

On Page 1, in the patent heading, the phrase ---assignor to Stauffer Chemical Company, New York, N. Y., a corporation of Delaware --, should be inserted In Column 1, paragraph 1, the portion reading "and now abandoned, entitled PROCESS OF MANUFACTURING N-MERCAPTOMETHYLPHTHALIMIDE." should read ---entitled PROCESS OF MANUFACTURING N-MERCAPTOMETHYLPHTHALIMIDE, and now abandoned.---

In Column 2, line 43, the word "pressed" should read ---passed---.

In Column 3, line 18, the numerals "0.977" should read ---.977---.

In Column 3, line 19, the word "was" should read ---were---.

In Column 3, line 46, the word "was" should read ---as---.

In Column 4, line 34, the portion of the line reading "pounds The LD-50" should read ---pounds. The LD-50---.

In Column 4, line 51, the portion of the line reading "diluting distilled water." should read ---diluting with distilled water.---.

In Column 5, TABLE I, the heading "PE tg Eggs" should read ---PE Eggs---.

Signed and sealed this 24th day of September 1974.

(SEAL)
Attest:

McCOY M. GIBSON JR.
Attesting Officer

C. MARSHALL DANN
Commissioner of Patents